(12) United States Patent
Jang

(10) Patent No.: US 8,432,521 B2
(45) Date of Patent: Apr. 30, 2013

(54) LIQUID CRYSTAL DISPLAY AND MANUFACTURING METHOD OF THE SAME

(75) Inventor: Yong-Kyu Jang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 231 days.

(21) Appl. No.: 13/069,815

(22) Filed: Mar. 23, 2011

(65) Prior Publication Data

US 2012/0099065 A1 Apr. 26, 2012

(30) Foreign Application Priority Data

Oct. 22, 2010 (KR) .......................... 10-2010-0103700

(51) Int. Cl.
*G02F 1/1343* (2006.01)
*G02F 1/1337* (2006.01)

(52) U.S. Cl.
USPC ............ 349/141; 349/132; 349/139; 349/123

(58) Field of Classification Search .................. 349/141, 349/132, 139, 123
See application file for complete search history.

(56) References Cited

U.S. PATENT DOCUMENTS

| | | | | |
|---|---|---|---|---|
| 5,670,609 A | * | 9/1997 | Auman et al. | 528/353 |
| 5,925,423 A | * | 7/1999 | Han et al. | 358/1.15 |
| 6,818,363 B2 | * | 11/2004 | Fincher et al. | 430/11 |
| 7,728,934 B2 | * | 6/2010 | Chang | 349/124 |
| 8,153,208 B2 | * | 4/2012 | Lee et al. | 428/1.1 |
| 2011/0051065 A1 | * | 3/2011 | Seong et al. | 349/123 |

FOREIGN PATENT DOCUMENTS

| | | |
|---|---|---|
| JP | 2010-008564 | 1/2010 |
| KR | 10-2007-0002465 | 1/2007 |
| KR | 10-0677804 | 1/2007 |
| KR | 10-2008-0056164 | 6/2008 |
| KR | 10-2010-0014375 | 2/2010 |
| KR | 10-2010-0026997 | 3/2010 |

* cited by examiner

Primary Examiner — Mike Qi
(74) Attorney, Agent, or Firm — Christie, Parker & Hale, LLP

(57) ABSTRACT

A liquid crystal display (LCD) includes: a first substrate; a second substrate facing the first substrate; a first electrode and a second electrode formed on the first substrate; and a liquid crystal layer interposed between the first substrate and the second substrate, wherein a first alignment polymer configured to provide an alignment force to the liquid crystal is at a portion of the liquid crystal layer near the first substrate.

19 Claims, 10 Drawing Sheets

LIQUID CRYSTAL DISPLAY AND MANUFACTURING METHOD OF THE SAME

CROSS-REFERENCE TO RELATED APPLICATION

This application claims priority to and the benefit of Korean Patent Application No. 10-2010-0103700 filed in the Korean Intellectual Property Office on Oct. 22, 2010, the entire contents of which are incorporated herein by reference.

BACKGROUND

1. Field

The described technology relates generally to a liquid crystal display (LCD) and a manufacturing method thereof.

2. Description

Currently, various flat panel displays are being developed. Among them, a liquid crystal display is widely used as a flat panel display.

Liquid crystal displays (LCDs) are classified into a TN (twisted nematic) type, a VA (vertically aligned) type, an IPS (in plane switching) type, an ECB (electrically controlled birefringence) type, a PLS (plane to line switching) type, an FFS (fringe field switching) type, or other types according to an arrangement state and driving method of the liquid crystal. Regarding the liquid crystal displays, liquid crystal is initially arranged in a predetermined manner because of the influence of an alignment layer or characteristics of the liquid crystal, and when an electric field is applied, the liquid crystal is arranged in another (or different) manner such that the polarization state of light that passes through the liquid crystal becomes differentiated according to the arrangement state of the liquid crystal due to optical anisotropy of the liquid crystal, and the differentiation is displayed as a difference of (or change in) the amount of transmitted light by using (or through) a polarizer, thereby displaying an image.

Among the types of liquid crystal displays, the liquid crystal display (LCD) of the TN type, the IPS type, the ECB type, the PLS type, and the FFS type can be classified as being a horizontal type because the liquid crystal is initially aligned horizontally, an upper alignment layer and a lower alignment layer to determine (or control) the alignment direction of the liquid crystal are respectively formed at an upper substrate and a lower substrate, the upper alignment layer and the lower alignment layer are respectively rubbed, and then liquid crystal is injected to form the liquid crystal layer.

However, various protrusions causing steps (or non-uniformities) exist on the lower substrate or the upper substrate such that texture due to non-uniformity of rubbing strength and abrasion non-uniformity of a rubber are generated in the liquid crystal display (LCD) when performing the rubbing process under the existence of the steps, and thereby optical characteristics such as transmittance and contrast ratio are deteriorated.

The above information disclosed in this Background section is only for enhancement of understanding of the background of the described technology and therefore it may contain information that does not form the prior art that is already known in this country to a person of ordinary skill in the art.

SUMMARY

Embodiments of the present invention provide a liquid crystal display (LCD) and a manufacturing method to improve optical characteristics.

A liquid crystal display (LCD) according to an exemplary embodiment includes: a first substrate; a second substrate facing the first substrate; a first electrode and a second electrode formed on the first substrate; and a liquid crystal layer interposed between the first substrate and the second substrate, wherein a first alignment polymer configured to provide an alignment force to the liquid crystal is at a portion of the liquid crystal layer near the first substrate.

The liquid crystal display may further include a first alignment layer at the first substrate and contacting the liquid crystal layer, wherein the first alignment polymer may be at a portion of the liquid crystal layer near the first alignment layer, and the first alignment layer may be a material configured to horizontally align a liquid crystal of the liquid crystal layer.

The first alignment polymer may include a polymerized photo-polymerizable monomer or oligomer.

The liquid crystal layer may include unpolymerized photo-polymerizable monomer or oligomer.

A second alignment polymer may be at a portion of the liquid crystal layer near the second substrate, and the second alignment polymer may be configured to provide an alignment force to a liquid crystal of the liquid crystal layer.

The liquid crystal display may further include a second alignment layer at the second substrate and contacting the liquid crystal layer, the second alignment polymer may be at a portion of the liquid crystal layer near the second alignment layer, and the second alignment layer may be a material configured to horizontally align the liquid crystal of the liquid crystal layer.

The second alignment polymer may include a polymerized photo-polymerizable monomer or oligomer.

The liquid crystal layer may include unpolymerized photo-polymerizable monomer or oligomer.

The first electrode may include a linear pixel electrode of a plurality of linear pixel electrodes, the second electrode may include a linear common electrode of a plurality of linear common electrodes, and the linear pixel electrodes and the linear common electrodes may be alternately arranged on the first substrate.

The first electrode may include a linear pixel electrode, and the second electrode may include a common electrode having a continuous surface in a pixel area.

According to one embodiment in a method for manufacturing a liquid crystal display (LCD) the method includes: forming a first electrode and a second electrode on a first substrate; forming a second substrate; injecting a liquid crystal and a photo-polymerizable monomer or oligomer between the first substrate and the second substrate; and irradiating light to form an alignment polymer by polymerizing the photo-polymerizable monomer or oligomer.

The photo-polymerizable monomer or oligomer may be polymerized under an electric field or a magnetic field.

The photo-polymerizable monomer or oligomer may be polymerized under a temperature in the range from $-20°$ C. to $30°$ C.

The method may further include forming a second alignment layer on the second substrate, and rubbing the second alignment layer with a rubbing strength of less than 250 mm.

The method may further include forming a first alignment layer on the first substrate.

The method may further include rubbing the first alignment layer with a rubbing strength of less than 250 mm.

The alignment polymer may include a first alignment polymer near the first alignment layer and a second alignment polymer near the second alignment layer.

The first electrode may include a linear pixel electrode of a plurality of linear pixel electrodes, the second electrode may include a linear common electrode of a plurality of linear common electrodes, and the linear pixel electrode and the linear common electrode may be alternately arranged on the first substrate.

The first electrode may include a linear pixel electrode, and the second electrode may include a common electrode having a continuous surface in a pixel area.

According to an exemplary embodiment, the first alignment layer and the second alignment layer or the second alignment layer is rubbed with a rubbing strength of less than 250 mm in the horizontal alignment type liquid crystal display (LCD), after the liquid crystal is injected along with the photo-polymerizable monomer or oligomer and is horizontally aligned, and ultraviolet (UV) rays are irradiated to form the first and second alignment polymers by polymerizing the photo-polymerizable monomer or oligomer such that the liquid crystal may have a pre-tilt, and thereby the alignment stability of the liquid crystal may be reinforced on the whole region of the substrate.

Accordingly, stains or light leakage related to the rubbing may be reduced or eliminated, and optical characteristics such as transmittance and contrast ratio may be improved.

Also, in the horizontal alignment type liquid crystal display (LCD), the liquid crystal has the pre-tilt such that the liquid crystal near the facing substrate where the linear common electrode and the linear pixel electrode are positioned is inclined according to the pre-tilt under the application of the electric field, and thereby the response speed is very fast. Accordingly, an after-image of a motion picture may be reduced or eliminated.

Also, the linear common electrode and the linear pixel electrode are made of the conductive layer such as ITO or IZO and the liquid crystal on the linear common electrode and the linear pixel electrode also has the pre-tilt and is directly inclined in the direction parallel to the electric field under the driving voltage such that the liquid crystal contributing to the image display is increased. Accordingly, the aperture ratio is improved, thereby increasing the luminance.

DETAILED DESCRIPTION OF THE EMBODIMENTS

Figure 1:
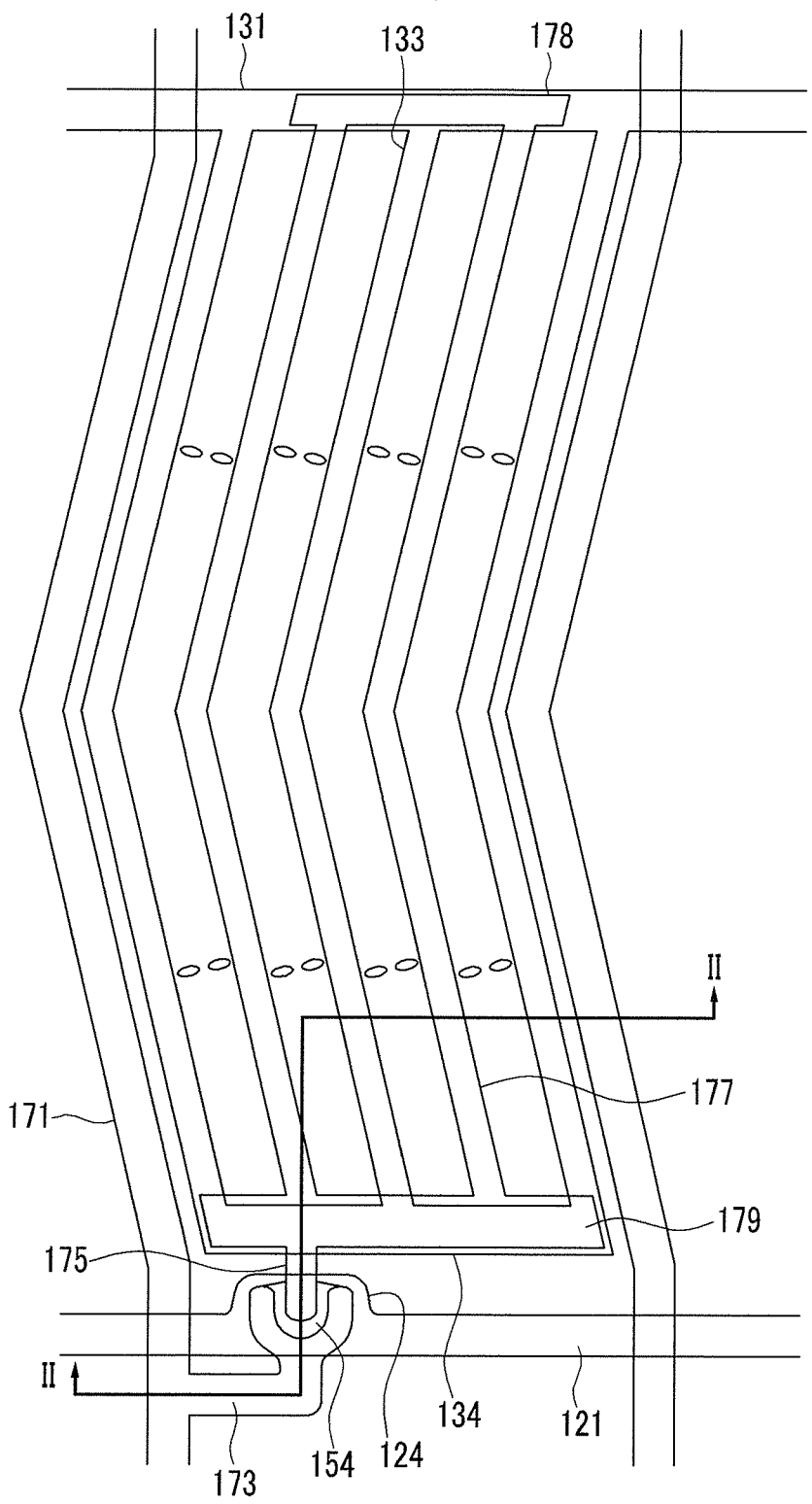
FIG. 1 is a plan view of a liquid crystal display (LCD) according to a first exemplary embodiment.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for understanding and for ease of description, but embodiments of the present invention are not limited thereto.

Now, a liquid crystal display (LCD) according to the first exemplary embodiment will be described with reference to FIG. 1 and FIG. 2.

Figure 2:
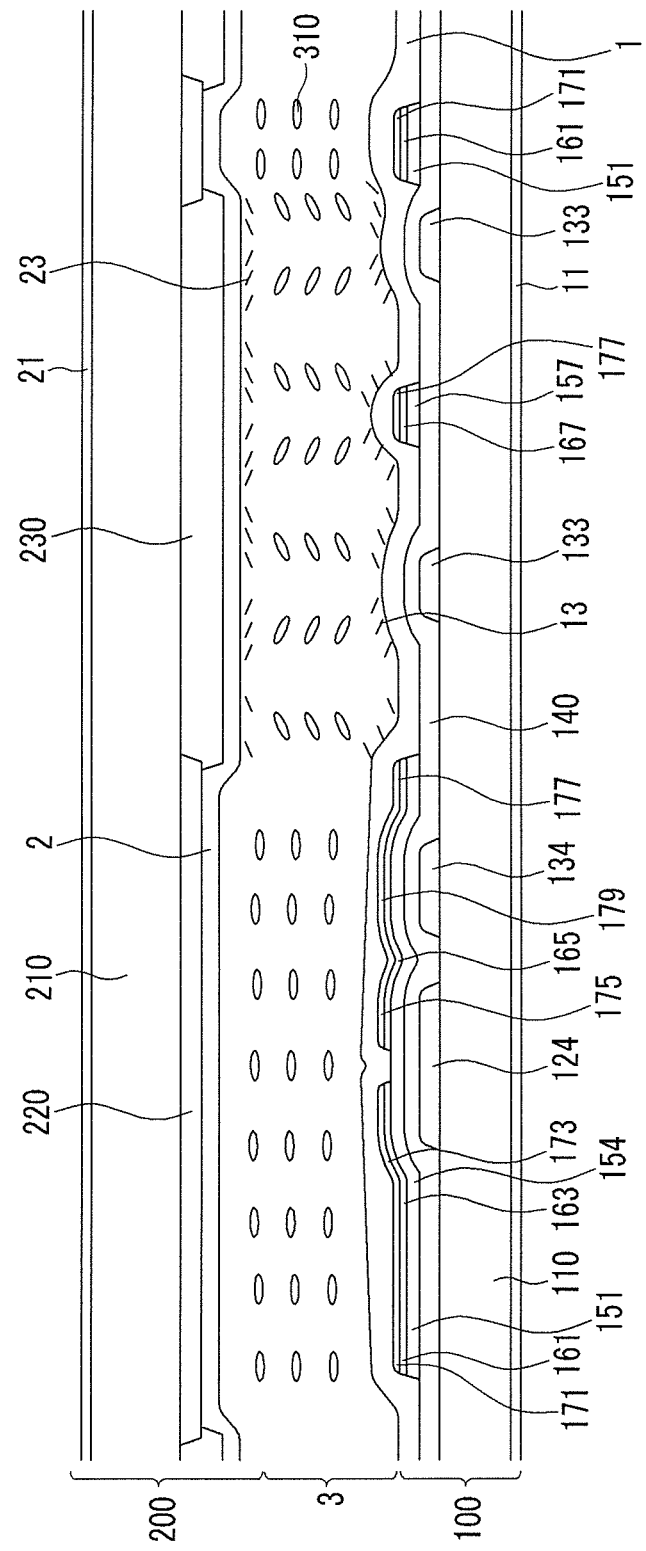
FIG. 2 is a cross-sectional view taken along the line II-II of FIG. 1.

FIG. 1 is a plan view of a liquid crystal display (LCD) according to a first exemplary embodiment, and FIG. 2 is a cross-sectional view taken along the line II-II of FIG. 1.

A liquid crystal display (LCD) according to the first exemplary embodiment including a thin film transistor substrate 100, a facing substrate 200, a liquid crystal layer 3, a lower polarizing plate 11, and an upper polarizing plate 21, is a liquid crystal display (LCD) of an IPS type.

The thin film transistor substrate 100 includes a first substrate 110 and thin films formed thereon, and the facing substrate 200 includes a second substrate 210 and thin films formed thereon.

Firstly, the thin film transistor substrate 100 will be described.

A gate line 121 including a gate electrode 124 and a common electrode line 131 extend in a transverse direction on the first substrate 110 (which may be made of transparent glass). The common electrode line 131 is coupled to linear common electrodes 133 and 134. The gate line 121 is configured to receive and transmit a scan signal, and the common electrode line 131 is configured to receive and transmit a common voltage. The linear common electrodes 133 and 134 include a common electrode portion 133 coupled to (or directly connected to) the common electrode line 131 and a common connection 134 coupling (or connecting) the other ends of the common electrode portion 133. The common electrode portion 133 is bent at a central portion (e.g., at the center). The linear common electrodes 133 and 134 may be made of a transparent conductor (or a transparent conductive layer) such as ITO (indium tin oxide) or IZO (indium zinc oxide).

A gate insulating layer 140 is formed on the gate line 121 and the common electrode line 131, intrinsic semiconductors 151, 154, and 157 made of amorphous silicon are formed on the gate insulating layer 140, and ohmic contact members 161, 163, 165, and 167 made of a material such silicide or n+ hydrogenated amorphous silicon doped with an n-type impurity of a high concentration are formed on the intrinsic semiconductors 151, 154, and 157. The intrinsic semiconductors 151, 154, and 157 may be called a semiconductor together with the ohmic contact members 161, 163, 165, and 167. The semiconductor may be constituted by the intrinsic semiconductor and ohmic contact layers, and is a polysilicon semiconductor or an oxide semiconductor.

A data line 171 including a plurality of source electrodes 173, a drain electrode 175, and a linear pixel electrode (177, 178, and 179) connected to the drain electrode 175 are formed on the ohmic contact members 161, 163, 165, and 167. The data line 171 is applied with a video signal voltage. The drain electrode 175 faces the source electrode 173 on the gate electrode 124. The channel portion of the intrinsic semiconductor 154 between the source electrode 173 and the drain electrode 175 is exposed. The linear pixel electrode (177, 178, and 179) includes a pixel electrode portion 177 parallel to the common electrode portion 133, a first pixel connection 179 connected to the drain electrode 175 and connecting one end of each of the pixel electrode portions 177, and a second pixel connection 178 connecting the other ends of the pixel electrode portions 177. A central portion (e.g., the center) of the pixel electrode unit 177 is bent in a manner similar to that of the common electrode portion 133. Also, the data line 171 is bent according to the shapes of the pixel electrode portion 177 and the common electrode portion 133. The linear pixel electrode (177, 178, and 179) connected to the data line 171, the drain electrode 175, and the drain electrode 175 can be made of transparent conductive layers such as indium tin oxide (ITO) or indium zinc oxide (IZO).

The data line 171, the drain electrode 175, and the linear pixel electrode (177, 178, and 179) may have substantially the same surface shape as the ohmic contacts 161, 163, 165, and 167, and the intrinsic semiconductors 151, 154, and 157 may have substantially the same surface shape as the ohmic contacts 161, 163, 165, and 167 except the source electrode 173 and the drain electrode 175. Differing from this, the ohmic contacts and the intrinsic semiconductors can be formed in an island form and be disposed around the gate electrode 124.

The gate electrode 124, source electrode 173, and drain electrode 175 form a thin film transistor (TFT) together with the intrinsic semiconductor 154, and a channel of the thin film transistor is formed on the channel of the intrinsic semiconductor 154 between the source electrode 173 and the drain electrode 175.

A first alignment layer 1 is formed on the data line 171, the drain electrode 175, and the linear pixel electrode (177, 178, and 179). The first alignment layer 1 is a liquid crystal horizontal alignment layer such as a polyamic acid, a polyimide, nylon, PVA (polyvinyl alcohol), and PVC (polyvinyl chloride). The first alignment layer 1 is made of a material having a horizontal alignment characteristic such that a director of liquid crystal 310 is initially aligned horizontally (e.g., parallel) with respect to the substrate surface. The first alignment layer 1 may slightly undergo a rubbing process such that the liquid crystal 310 near the first alignment layer 1 may have a pre-tilt.

A rubbing strength (RS) may be represented by Equation 1.

$$RS = N*M(1 + 2\pi r n/v) \quad \text{(Equation 1)}$$

Here, N is a rubbing number, M is a contact depth between a rubber and the substrate, r is a radius of a rubbing roller, n is a rotation number of a rubbing roller, and v is a moving speed of a substrate. RS is a value (e.g., a fixed value) corresponding to a rubbing device such that the rubbing strength may be controlled by changing N, M, n, or v.

In an exemplary embodiment, the first alignment layer 1 slightly undergoes the rubbing process with rubbing strength less of than 250 mm.

Next, the facing substrate 200 will be described.

A light blocking member 220 is formed on the second substrate 210 (which may be made of transparent glass), and a color filter 230 is formed in each region partitioned by the light blocking member 220.

The color filter 230 and the light blocking member 220 may be formed on the thin film transistor substrate 100.

A second alignment layer 2 is formed on the color filter 230. The second alignment layer 2 is a liquid crystal horizontal alignment layer such as polyamic acid, polyimide, nylon, PVA (polyvinyl alcohol), and PVC (polyvinyl chloride). The second alignment layer 2 is made of a material having a horizontal alignment characteristic such that a director of the liquid crystal 310 is initially aligned horizontally with respect to the substrate surface. In one embodiment, the second alignment layer 2 slightly undergoes the rubbing process with rubbing strength of less than 250 mm such that the liquid crystal 310 near the second alignment layer 2 may have the pre-tilt.

The liquid crystal layer 3 includes a liquid crystal 310 having an anisotropic positive dielectric constant, and a first alignment polymer 13 positioned near the first alignment layer 1 and a second alignment polymer 23 near the second alignment layer 2 are formed in the liquid crystal layer 3.

The first alignment polymer 13 is formed by photo-polymerizing a photo-polymerizable monomer or oligomer 33 (see, e.g., FIG. 4) included in the liquid crystal layer 3 to provide the alignment force to the liquid crystal 310, and the second alignment polymer 23 is formed by photo-polymerizing the photo-polymerizable monomer or oligomer 33 included in the liquid crystal layer 3 to provide the alignment force to the liquid crystal 310. The photo-polymerizable monomer or oligomer 33 that is not photo-polymerized may remain in the liquid crystal layer 3.

The photo-polymerizable monomer or oligomer 33 includes a reactive mesogen (RM) such as a product from the Norland™ Optical Adhesive (NOA) series by Norland Products Inc. of Cranbury, N.J., USA. The reactive mesogen (RM) represents a polymerizable reactive mesogen compound. The mesogen compound or mesogen material includes a material or compounds including the mesogen radical of at least one of stick, plate, and disk shapes, that is, a radical that is capable of generating a liquid crystalline phase behavior. The liquid crystal compound having a radical in the shape of a stick or a plate is a calamitic liquid crystal that is well known to a person of ordinary skill in the art, and the liquid crystal compound having a radical in the shape of a disk is a liquid crystal that is also well known to a person of ordinary skill in the art. The compound or material including the mesogen radical does not need to exhibit a liquid crystalline phase. Also, it is possible to show the liquid crystalline phase behavior through mixture with another compound, or a mesogen compound or material, or when their mixture is polymerized.

The reactive mesogen is polymerized by light such as the ultraviolet rays, and it represents a material that is aligned depending on the alignment state of the near material. An example of the reactive mesogen can be a compound that is expressed in the following equation.

$$P1-A1-(Z1-A2)n-P2,$$

Here, P1 are P2 are independently selected from among acrylate, methacrylate, vinyl, vinyloxy, and epoxy groups, A1 and A2 are independently selected from 1,4-phenylene and naphthalene-2,6-diyl groups, Z1 is one of COO—, OCO—, and a single bond, and n is one of 0, 1, and 2.

In further detail, a compound expressed as one of the next equations can be exemplified.

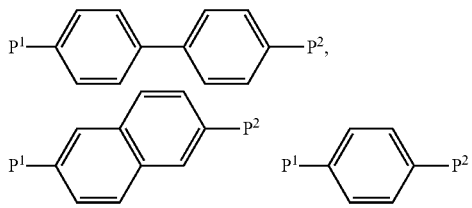

Here, P1 and P2 are independently selected from acrylate, methacrylate, vinyl, vinyloxy, and epoxy groups.

The lower polarizing plate 11 and the upper polarizing plate 21 can be disposed to have crossed transmissive axes.

As described above, the first alignment polymer 13 provides the alignment force to the liquid crystal 310 such that the alignment force of the liquid crystal 310 near the first alignment polymer 13 and having the pre-tilt may be reinforced. Also, the second alignment polymer 23 provides the alignment force to the liquid crystal 310 such that the alignment force of the liquid crystal 310 near the second alignment polymer 23 and having the pre-tilt may be reinforced.

As described above, if the liquid crystal 310 near the first alignment layer 1 and the second alignment layer 2 has the pre-tilt, the liquid crystal 310 near the facing substrate that does not include the linear common electrode and the linear pixel electrode is inclined according to the pre-tilt under the application of the electric field such that the response speed is fast. Accordingly, a problem related to the after-image of moving pictures may be reduced or solved.

Also, according to one embodiment of the present invention, the linear common electrode (133 and 134) and the linear pixel electrode (177, 178, and 179) are made of the transparent conductive layer such as ITO or IZO, and the liquid crystal 310 on the linear common electrode (133 and 134) and the linear pixel electrode (177, 178, and 179) also have the pre-tilt such that they are directly inclined in the direction parallel to the electric field under the application of the driving voltage, and thereby the area or amount of liquid crystal 310 contributing to the image display is increased. Accordingly, the aperture ratio is improved such that the luminance is increased.

In the above-described exemplary embodiment, the first alignment layer 1 and the second alignment layer 2 are both formed, however in other embodiments, only one of the first alignment layer 1 and the second alignment layer 2 may be formed or both the first alignment layer 1 and the second alignment layer 2 may not be formed.

Figure 3:
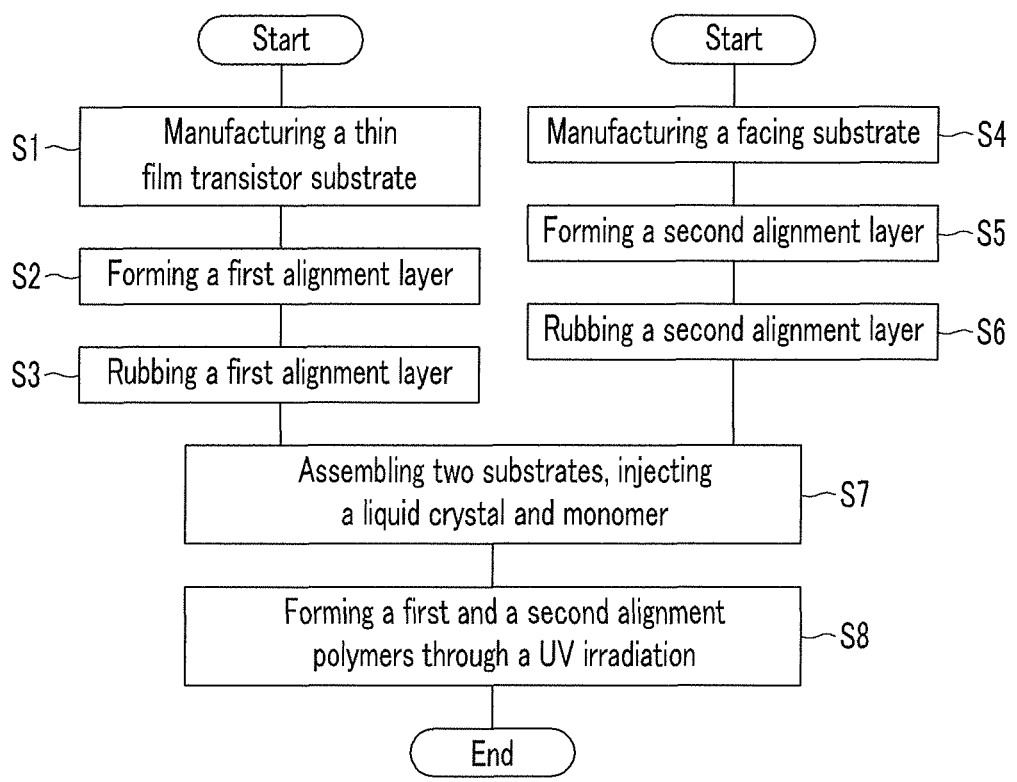
FIG. 3 is a flowchart of a manufacturing method of a liquid crystal display (LCD) according to the first exemplary embodiment.

FIG. 3 is a flowchart of a manufacturing method of a liquid crystal display (LCD) according to the first exemplary embodiment.

As shown in FIG. 3, a thin film transistor (TFT) substrate 100 is manufactured (S1). The thin film transistor substrate 100 is manufactured by form a gate line 121, a data line 171 crossing the gate line 121, a thin film transistor including a control electrode and an input electrode respectively coupled to the gate line 121 and the data line 171, a linear pixel electrode (177, 178, and 179) coupled to an output terminal of the thin film transistor, a linear common electrode (133 and 134) facing the linear pixel electrode (177, 178, and 179), and a common electrode line 131 for applying a common voltage to the linear common electrode (133 and 134) on the first substrate 110. A step having a cross-sectional shape corresponding to the pattern such as the thin film transistor, the linear pixel electrode (177, 178, and 179), the linear common electrode (133 and 134), and the common electrode line 131 is formed on the thin film transistor substrate 100.

Next, the first alignment layer 1 is formed on the thin film transistor substrate 100 (S2). The first alignment layer 1 is a liquid crystal horizontal alignment layer such as a polyamic acid, a polyimide, nylon, PVA (polyvinyl alcohol), and PVC (polyvinyl chloride). The first alignment layer 1 is made of a material having a horizontal alignment characteristic such that a director of the liquid crystal 310 is initially aligned horizontally (e.g., parallel) with respect to the substrate surface.

Next, the first alignment layer 1 is slightly rubbed in a rubbing direction (e.g., a predetermined rubbing direction) with a rubbing strength of less than 250 mm. Accordingly, non-uniformity of the rubbing strength and the abrasion non-uniformity of the rubber by the step may be reduced or prevented on the thin film transistor substrate 100 (S3).

A facing substrate 200 that will be assembled to face the thin film transistor substrate 100 is manufactured (S4). The color filter 230 and the light blocking member 220 may be formed in the facing substrate 200. A step having a cross-sectional shape corresponding to the pattern such as the color filter 230 and the light blocking member 220 is formed on the facing substrate 200.

Next, the second alignment layer 2 is formed on the facing substrate 200 (S5). The second alignment layer 2 is a liquid crystal horizontal alignment layer such as a polyamic acid, a polyimide, nylon, PVA (polyvinyl alcohol), and PVC (polyvinyl chloride). The second alignment layer 2 is made of a material having a horizontal alignment characteristic such that a director of the liquid crystal 310 is initially aligned horizontally (e.g., parallel) with respect to the substrate surface.

Next, the second alignment layer 2 is slightly rubbed in a rubbing direction (e.g., a predetermined rubbing direction) with a rubbing strength of less than 250 mm. Accordingly, non-uniformity of the rubbing strength and the abrasion non-uniformity of the rubber by the step on the facing substrate 200 may be reduced or prevented (S6).

Next, the thin film transistor substrate 100 and the facing substrate 200 that are provided in this way are assembled and the liquid crystal 310 and the photo-polymerizable monomer or oligomer 33 are injected together between the two substrates (S7). The injected liquid crystal 310 is aligned according to the rubbing direction of the first alignment layer 1 and the second alignment layer 2.

Next, light such as ultraviolet (UV) rays is irradiated to form the first alignment polymer 13 and the second alignment polymer 23 by polymerizing the photo-polymerizable monomer or oligomer 33 such that the alignment of the liquid crystal 310 is fixed and stabilized (S8).

When the ultraviolet (UV) rays are irradiated, the photo-polymerizable monomer or oligomer 33 that is mixed along with the liquid crystal 310 is polymerized such that the first alignment polymer 13 is formed at a position near the first alignment layer 1 and the second alignment polymer 23 is formed at a position near the second alignment layer 2.

The first alignment polymer 13 and the second alignment polymer 23 maintain the arrangement according to the rubbing direction of the first alignment layer 1 and the second alignment layer 2, respectively, such that the arrangement (or alignment) of the liquid crystal 310 adjacent thereto is influenced. As described above, the first alignment polymer 13 and the second alignment polymer 23 reinforce the anchoring energy of the liquid crystal 310 such that the alignment of the liquid crystal 310 by the rubbing of the first alignment layer 1 and the second alignment layer 2 is reinforced, thereby enhancing the alignment stability of the liquid crystal 310.

Also, the rubbing process is weakly performed with a rubbing strength of less than 250 mm such that the non-uniformity of the rubbing strength and the abrasion non-uniformity of the rubber that are generated when the rubbing process is performed is reduced or prevented such that the stain due to the rubbing or the light leakage may be reduced or eliminated, and the optical characteristics such as the transmittance and the contrast ratio may be improved.

In addition, when the ultraviolet (UV) rays are irradiated, the process may be performed under an electric field or a magnetic field such that an order parameter of the liquid crystal may be increased, and thereby the alignment stability of the liquid crystal may be further reinforced.

Also, when the ultraviolet (UV) rays are irradiated, the process may be performed at a low temperature of less than room temperature such as in the range from −20° C. to less than 30° C., such that the order parameter of the liquid crystal may be increased, and thereby the alignment stability of the liquid crystal may be further reinforced. At temperatures below −20° C., the liquid crystal has less influence by the electric field or magnetic field such that it is difficult to control the alignment direction of the liquid crystal, and at temperatures greater than 30° C., the movement of the liquid crystal may be increased and the alignment of the liquid crystal may be unstable, such that the process is preferably performed at a temperature of more than −20° C. and less than 30° C.

Next, a manufacturing method of a liquid crystal display (LCD) according to the first exemplary embodiment will be described with reference to FIG. 4 and FIG. 5.

Figure 4:
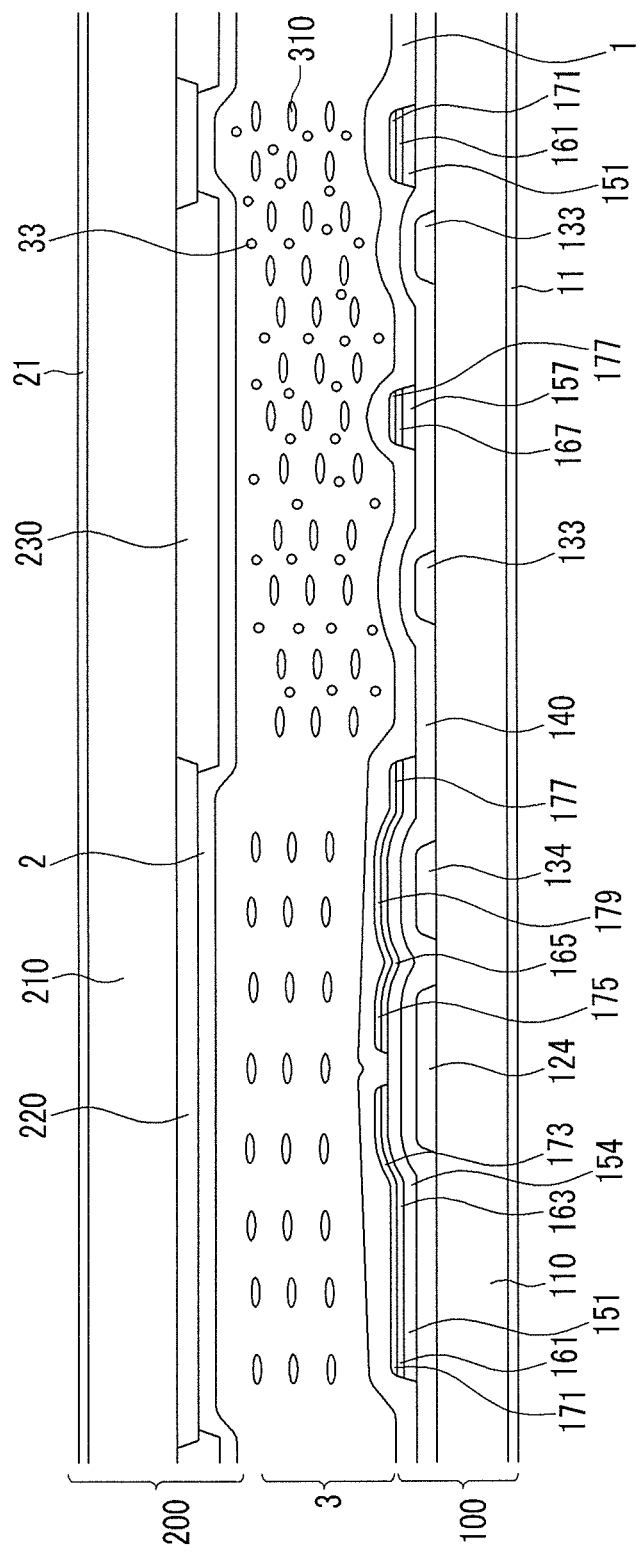
FIG. 4 is a cross-sectional view showing a step of aligning a liquid crystal according to a rubbing direction of an alignment layer after injecting a liquid crystal and a photo-polymerizable monomer or oligomer in a manufacturing method of a liquid crystal display (LCD) according to the first exemplary embodiment.
Figure 5:
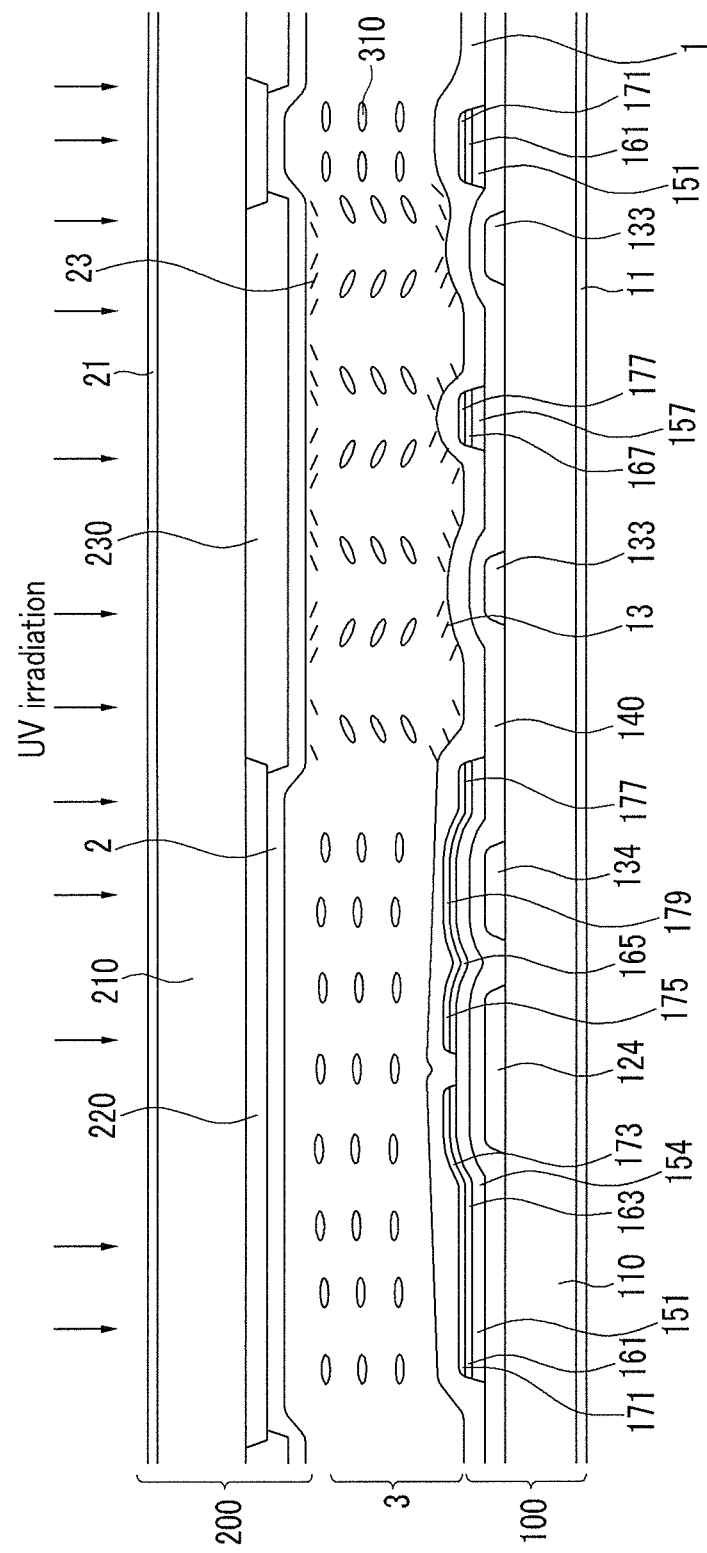
FIG. 5 is a cross-sectional view showing a step of enhancing alignment stability of a liquid crystal after irradiating ultraviolet (UV) rays to form the first and second alignment polymers in a manufacturing method of a liquid crystal display (LCD) according to the first exemplary embodiment.

FIG. 4 is a cross-sectional view showing a step of aligning a liquid crystal according to a rubbing direction of an alignment layer after injecting a liquid crystal and a photo-polymerizable monomer or oligomer in a manufacturing method of a liquid crystal display (LCD) according to the first exemplary embodiment, and FIG. 5 is a cross-sectional view showing a step of enhancing alignment stability of a liquid crystal after irradiating ultraviolet (UV) rays to form the first and second alignment polymers in a manufacturing method of a liquid crystal display (LCD) according to the first exemplary embodiment.

Firstly, as shown in FIG. 4, thin films including various wires, a thin film transistor, a linear common electrode (133 and 134), and a linear pixel electrode (177, 178, and 179) are formed on the first substrate 110 through a thin film deposition process, a photolithography process, or a photo-etching process. Also, thin films including a light blocking member 220 and a color filter 230 are formed on the second substrate 210 through a thin film deposition process, a photolithography process, or a photo-etching process.

Next, an alignment base material is coated on the thin films of the thin film transistor substrate 100, and a heat treatment (curing) is performed at a temperature in the range from 100° C. to 180° C. for 0.5 to 1 hour to harden the alignment base material such that the first alignment layer 1 is formed. Also, an alignment base material is coated on the thin films of the facing substrate 200, and a heat treatment (curing) is performed at a temperature in the range from 100° C. to 180° C. for 0.5 to 1 hour to harden the alignment base material such that the second alignment layer 2 is formed.

Next, the thin film transistor substrate 100 and the facing substrate 200 are assembled. The assembly of the two substrates 100 and 200 may be performed through two methods.

According to one embodiment, a sealant is coated on one of the thin film transistor substrate 100 and the facing substrate 200 to define a filling region of the liquid crystal 310, the liquid crystal 310 is dripped (or injected) into the defined filling region, and the thin film transistor substrate 100 and the facing substrate 200 are aligned and combined. Here, a spacer to maintain a distance or an interval between the substrates 100 and 200 may be spayed after or before the dripping (or injecting) of the liquid crystal 310. The spacer may be previously formed on the thin film transistor substrate 100 and the facing substrate 200 through a thin film formation process. Here, the liquid crystal 310 is dripped (or injected) after adding a photo-polymerizable monomer or oligomer 33.

According to an alternative embodiment, a sealant is coated on one of the thin film transistor substrate 100 and the facing substrate 200 to define the region for filling the liquid crystal 310 to have an injection hole for the liquid crystal, and the two substrates 100 and 200 are aligned and combined. Next, the liquid crystal may be injected through the injection hole from a liquid crystal storage tank by submerging the injection hole in the liquid crystal of the liquid crystal storage tank while in a vacuum environment and then eliminating the vacuum, and then sealing the liquid crystal injection hole after the liquid crystal has been injected between the two substrates 100 and 200. Here, the liquid crystal is injected by adding the photo-polymerizable monomer or oligomer 33 to the liquid crystal 310.

Next, as shown in FIG. 5, light such as the ultraviolet rays is irradiated to the liquid crystal layer 3 to photo-polymerize the photo-polymerizable monomer or oligomer, thereby forming the first and second alignment polymers (or alignment control agents) 13 and 23. The first alignment polymer 13 is positioned near the first alignment layer 1, and the second alignment polymer 23 is positioned near the second alignment layer 2.

The first alignment polymer 13 and the second alignment polymer 23 reinforce the alignment of the liquid crystal 310 having the pre-tilt according to the rubbing direction of the first alignment layer 1 and the second alignment layer 2. The first alignment polymer 13 and the second alignment polymer 23 reinforce the anchoring energy fixing the alignment of the neighboring liquid crystal 310.

Accordingly, the first alignment polymer 13 and the second alignment polymer 23 reinforce the alignment of the liquid crystal 310 by the rubbing of the first alignment layer 1 and the second alignment layer 2 of the liquid crystal 310, thereby reinforcing the alignment stability of the liquid crystal 310.

Next, a module process is performed.

Although the manufacturing method of the liquid crystal display (LCD) according to the first exemplary embodiment rubs both the first alignment layer and the second alignment layer, according to other embodiments of the present invention, only one of them may be rubbed.

Next, a manufacturing method of a liquid crystal display (LCD) according to the second exemplary embodiment will be described with reference to FIG. 6.

Figure 6:
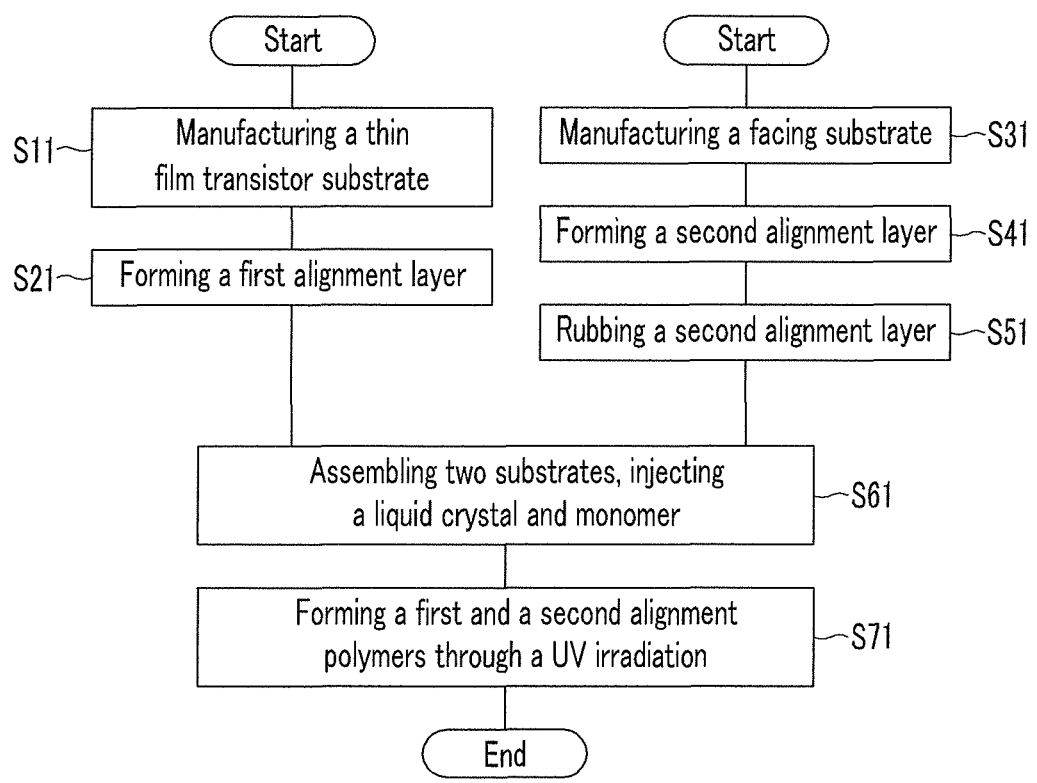
FIG. 6 is a flowchart of a manufacturing method of a liquid crystal display (LCD) according to a second exemplary embodiment.

FIG. 6 is a flowchart of a manufacturing method of a liquid crystal display (LCD) according to the second exemplary embodiment.

The second exemplary embodiment is substantially similar to the first exemplary embodiment of FIG. 3 except for only rubbing the second alignment layer. Therefore, the overlapping description will be omitted.

As shown in FIG. 6, firstly, a thin film transistor substrate 100 is manufactured (S11). A step having a cross-sectional shape corresponding to the pattern of the thin film transistor, the linear pixel electrode (177, 178, and 179), the linear common electrode (133 and 134), and the common electrode line 131 is formed on the thin film transistor substrate 100.

Next, the first alignment layer 1 is formed on the thin film transistor substrate 100 (S21). The first alignment layer 1 is made of a material having a horizontal alignment characteristic such that the director of the liquid crystal 310 is initially aligned horizontally (e.g., parallel) with respect to the surface of the substrate. The step on the thin film transistor substrate 100 is smaller than the step of the facing substrate 200 such that the rubbing process is not performed for the first alignment layer 1.

A facing substrate 200 that will be assembled to face the thin film transistor substrate 100 is manufactured (S31). A color filter 230 and a light blocking member 220 may be formed in the facing substrate 200. A step having a cross-sectional shape corresponding to the pattern such as the color filter 230 and the light blocking member 220 is formed on the facing substrate 200.

Next, the second alignment layer 2 is formed on the facing substrate 200 (S41). The second alignment layer 2 is made of a material having a horizontal alignment characteristic such that the director of the liquid crystal 310 is initially aligned horizontally (e.g., parallel) with respect to the surface of the substrate.

Next, the second alignment layer 2 is weakly rubbed in a rubbing direction (e.g., a predetermined rubbing direction) with a rubbing strength of less than 250 mm. As described above, the rubbing for the second alignment layer 2 is weakly performed such that the non-uniformity of the rubbing strength and the abrasion non-uniformity of the rubber by the step on the facing substrate 200 may be reduced or prevented (S51).

Next, the thin film transistor substrate 100 and the facing substrate 200 are assembled, and the liquid crystal 310 and the photo-polymerizable monomer or oligomer 33 are injected together between the two substrates (S61). Next, the injected liquid crystal 310 is aligned according to the rubbing direction of the second alignment layer 2.

Next, light such as ultraviolet (UV) rays is irradiated to form the first alignment polymer 13 and the second alignment polymer 23 by polymerizing the photo-polymerizable monomer or oligomer 33 such that the alignment of the liquid crystal 310 is fixed and stabilized (S71).

When the ultraviolet (UV) rays are irradiated, the photo-polymerizable monomer or oligomer 33 that is mixed along with the liquid crystal 310 is polymerized such that the first alignment polymer 13 is formed at the position near the first alignment layer 1 and the second alignment polymer 23 is formed at the position near the second alignment layer 2. The first alignment polymer 13 and the second alignment polymer 23 maintain the arrangement according to the rubbing direction of the second alignment layer 2 such that the arrangement of the liquid crystal 310 adjacent thereto is influenced. As described above, the first alignment polymer 13 and the second alignment polymer 23 reinforce the anchoring energy of the liquid crystal 310 such that the alignment of the liquid crystal 310 by the rubbing of the second alignment layer 2 is reinforced, thereby enhancing the alignment stability of the liquid crystal 310.

Also, the rubbing process is not performed for the first alignment layer 1 and the rubbing process is weakly performed for the second alignment layer 2, such that the non-uniformity of the rubbing strength and the abrasion non-uniformity of the rubber that are generated when the rubbing process is performed is reduced or prevented such that the stain due to the rubbing or the light leakage may be reduced or eliminated, and the optical characteristics such as the transmittance and the contrast ratio may be improved.

Also, when the ultraviolet (UV) rays are irradiated, the process may be performed at a low temperature of less than room temperature such that the order parameter of the liquid crystal may be increased, and thereby the alignment stability of the liquid crystal may be further reinforced. In addition, when the ultraviolet (UV) rays are irradiated, the process may be performed under the electric field or the magnetic field such that an order parameter of the liquid crystal may be increased, and thereby the alignment stability of the liquid crystal may be further reinforced.

On the other hand, in the manufacturing method of the liquid crystal display (LCD) according to the second exemplary embodiment, the first alignment layer is not rubbed, and the first alignment layer may not be formed.

Next, a manufacturing method of a liquid crystal display (LCD) according to the third exemplary embodiment will be described with reference to FIG. 7.

Figure 7:
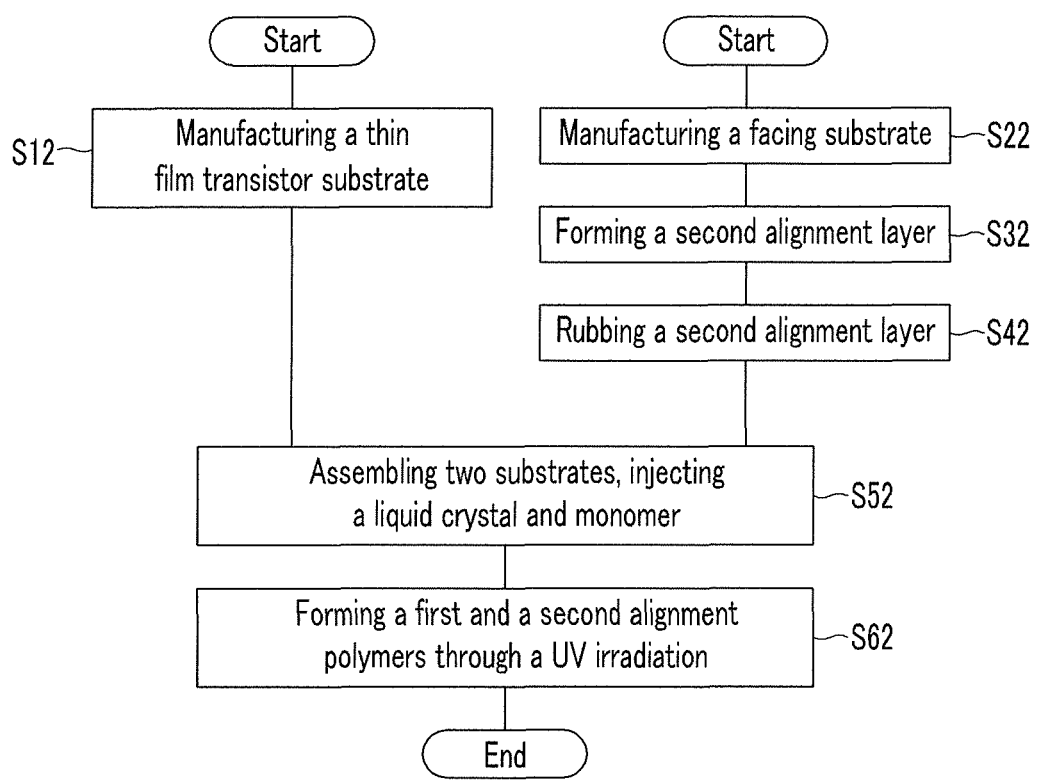
FIG. 7 is a flowchart of a manufacturing method of a liquid crystal display (LCD) according to a third exemplary embodiment.

FIG. 7 is a flowchart of a manufacturing method of a liquid crystal display (LCD) according to the third exemplary embodiment.

The third exemplary embodiment except for the first alignment layer that is not formed is substantially equivalent to the second exemplary embodiment shown in FIG. 6 such that the overlapping description is omitted.

As shown in FIG. 7, firstly, a thin film transistor substrate 100 is manufactured (S12). A step having a cross-sectional shape corresponding to the pattern of the thin film transistor, the linear pixel electrode (177, 178, and 179), the linear common electrode (133 and 134), and the common electrode line 131 is formed on the thin film transistor substrate 100. The step of the thin film transistor substrate 100 is smaller than the step on the facing substrate 200 such that the first alignment layer 1 is not formed.

Next, a facing substrate 200 that will be assembled to face the thin film transistor substrate 100 is manufactured (S22). A color filter 230 and a light blocking member 220 may be formed in the facing substrate 200. A step having a cross-sectional shape corresponding to the pattern such as the color filter 230 and the light blocking member 220 is formed on the facing substrate 200.

Next, the second alignment layer 2 is formed on the facing substrate 200 (S32). The second alignment layer 2 is made of a material having a horizontal alignment characteristic such that the director of the liquid crystal 310 is initially aligned horizontally (e.g., parallel) with respect to the surface of the substrate.

Next, the second alignment layer 2 is weakly rubbed in a rubbing direction (e.g., a predetermined rubbing direction) with a rubbing strength of less than 250 mm. As described above, the rubbing of the second alignment layer 2 is weak such that the non-uniformity of the rubbing strength and the abrasion non-uniformity of the rubber by the step on the facing substrate 200 may be reduced or prevented (S42).

Next, the thin film transistor substrate 100 and the facing substrate 200 that are provided in this way are assembled, and a liquid crystal 310 and a photo-polymerizable monomer or oligomer 33 are injected together between the two substrates (S52). The injected liquid crystal 310 is aligned according to the rubbing direction of the second alignment layer 2.

Next, light such as ultraviolet (UV) rays is irradiated to form the first alignment polymer 13 and the second alignment polymer 23 by polymerizing the photo-polymerizable monomer or oligomer 33 such that the alignment of the liquid crystal 310 is fixed and stabilized (S62).

When the ultraviolet (UV) rays are irradiated, the photo-polymerizable monomer or oligomer 33 that is mixed along with the liquid crystal 310 is polymerized such that the first alignment polymer 13 is formed at the position near the thin film transistor substrate 100 and the second alignment polymer 23 is formed at the position near the second alignment layer 2. The first alignment polymer 13 and the second alignment polymer 23 maintain the arrangement according to the rubbing direction of the second alignment layer 2 such that the arrangement of the liquid crystal 310 adjacent thereto is influenced. As described above, the first alignment polymer 13 and the second alignment polymer 23 reinforce the anchoring energy of the liquid crystal 310 such that the alignment of the liquid crystal 310 by the rubbing of the second alignment layer 2 is reinforced, thereby enhancing the alignment stability of the liquid crystal 310.

Also, the first alignment layer 1 is not formed and the rubbing process of the second alignment layer 2 is weak such that the non-uniformity of the rubbing strength and the abrasion non-uniformity of the rubber that are generated when the rubbing process is performed is reduced or prevented such that the stain due to the rubbing or the light leakage may be reduced or eliminated, and the optical characteristics such as the transmittance and the contrast ratio may be improved.

On the other hand, when the ultraviolet (UV) rays are irradiated, the process is performed at a low temperature of less than room temperature such that the order parameter of the liquid crystal may be increased, and thereby the alignment stability of the liquid crystal may be further reinforced. Also, when the ultraviolet (UV) rays are irradiated, the process is performed under the electric field or the magnetic field such that an order parameter of the liquid crystal may be increased, and thereby the alignment stability of the liquid crystal may be further reinforced.

As described above, according to the manufacturing method of the liquid crystal display (LCD) according to the third exemplary embodiment, the first alignment layer is not formed, and in other embodiments, the first alignment layer 1 and the second alignment layer 2 may both not be formed.

Next, a manufacturing method of a liquid crystal display (LCD) according to the fourth exemplary embodiment will be described with reference to FIG. 8.

Figure 8:
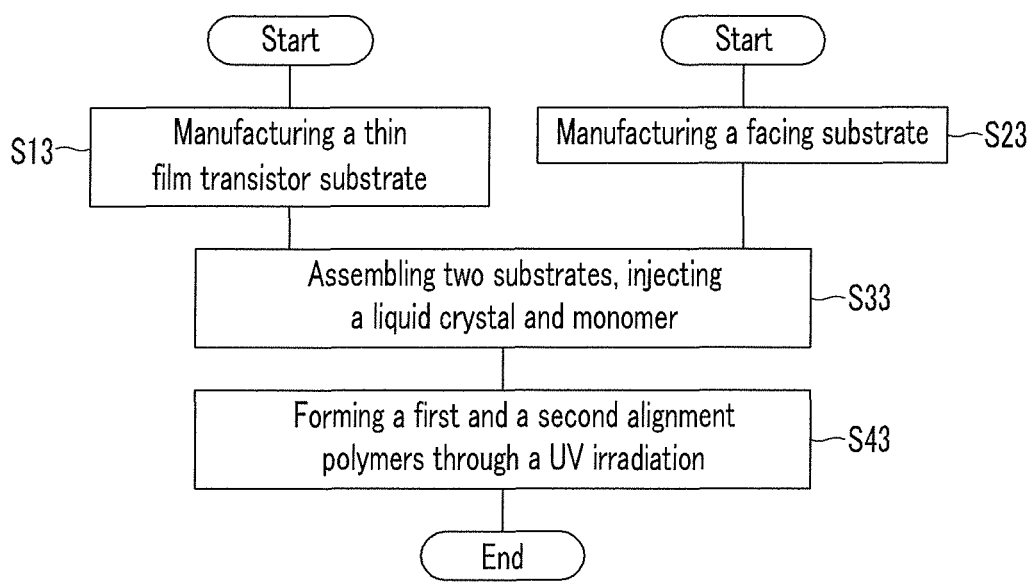
FIG. 8 is a flowchart of a manufacturing method of a liquid crystal display (LCD) according to a fourth exemplary embodiment.

FIG. 8 is a flowchart of a manufacturing method of a liquid crystal display (LCD) according to the fourth exemplary embodiment.

The fourth exemplary embodiment is substantially similar to the third exemplary embodiment of FIG. 7 except that the second alignment layer is not formed. As such, overlapping description will be omitted.

As shown in FIG. 8, a thin film transistor substrate 100 is manufactured (S13). A predetermined step due to the pattern such as the thin film transistor, the linear pixel electrode (177, 178, and 179), the linear common electrode (133 and 134), and the common electrode line 131 is formed on the thin film transistor substrate 100.

Next, a facing substrate 200 that will be assembled to face the thin film transistor substrate 100 is manufactured (S23). A color filter 230 and a light blocking member 220 may be formed in the facing substrate 200. A step having a cross-sectional shape corresponding to the pattern such as the color filter 230 and the light blocking member 220 is formed on the facing substrate 200.

Next, the thin film transistor substrate 100 and the facing substrate 200 that are provided in this way are assembled, and a liquid crystal 310 and a photo-polymerizable monomer or oligomer 33 are injected together between the two substrates (S33).

Next, light such as ultraviolet (UV) rays is irradiated to form the first alignment polymer 13 and the second alignment polymer 23 by polymerizing the photo-polymerizable monomer or oligomer 33 such that the alignment of the liquid crystal 310 is fixed and stabilized (S43). Here, the process is performed under the electric field or the magnetic field such that an order parameter of the liquid crystal may be increased, and thereby the alignment stability of the liquid crystal may be further reinforced.

When the ultraviolet (UV) rays irradiated, the photo-polymerizable monomer or oligomer 33 that is mixed along with the liquid crystal 310 is polymerized such that the first alignment polymer 13 is formed at the position near the thin film transistor substrate 100 and the second alignment polymer 23 is formed at the position near the facing substrate 200. The first alignment polymer 13 and the second alignment polymer 23 affect the arrangement of the adjacent liquid crystal 310. As described above, the first alignment polymer 13 and the second alignment polymer 23 reinforce the anchoring energy of the liquid crystal 310 such that the alignment of the liquid crystal 310 is reinforced, thereby enhancing the alignment stability of the liquid crystal 310.

Also, the first alignment layer 1 and the second alignment layer 2 are not formed, and therefore, the non-uniformity of the rubbing strength and the abrasion non-uniformity of the rubber that are generated under the rubbing process are prevented such that the stain due to the rubbing or the light leakage may be eliminated, and the optical characteristics such that the transmittance and the contrast ratio may be improved.

On the other hand, when the ultraviolet (UV) rays are irradiated, the process may be performed at a low temperature of less than room temperature such that the order parameter of the liquid crystal may be increased, and thereby the alignment stability of the liquid crystal may be further reinforced.

As described above, embodiment of the present invention may be applied to IPS type liquid crystal displays (LCDs), however embodiments of the present invention may also be applied to FFS (fringe field switching) type liquid crystal displays (LCDs).

Figure 9:
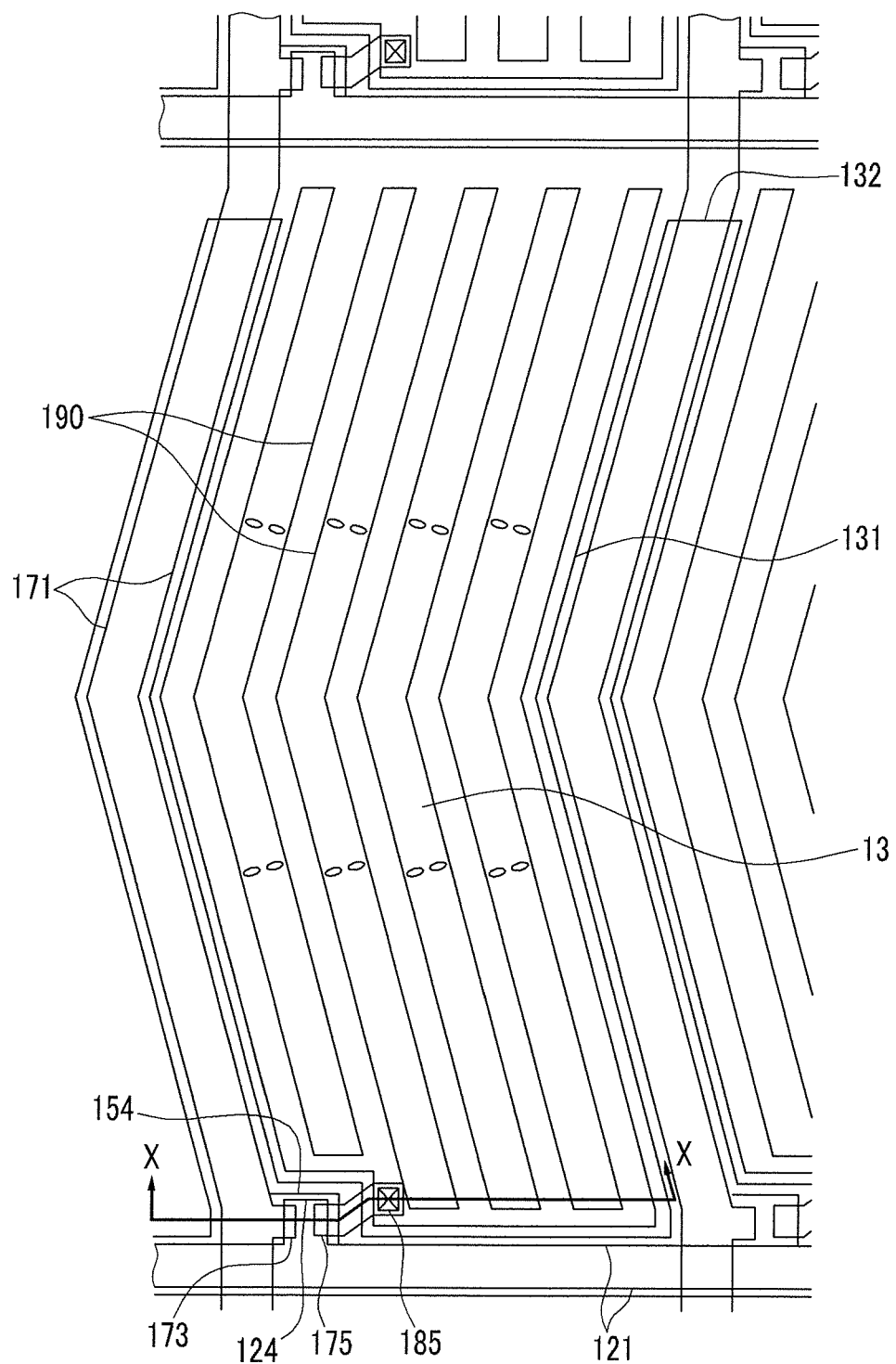
FIG. 9 is a plan view of a liquid crystal display (LCD) according to another exemplary embodiment.
Figure 10:
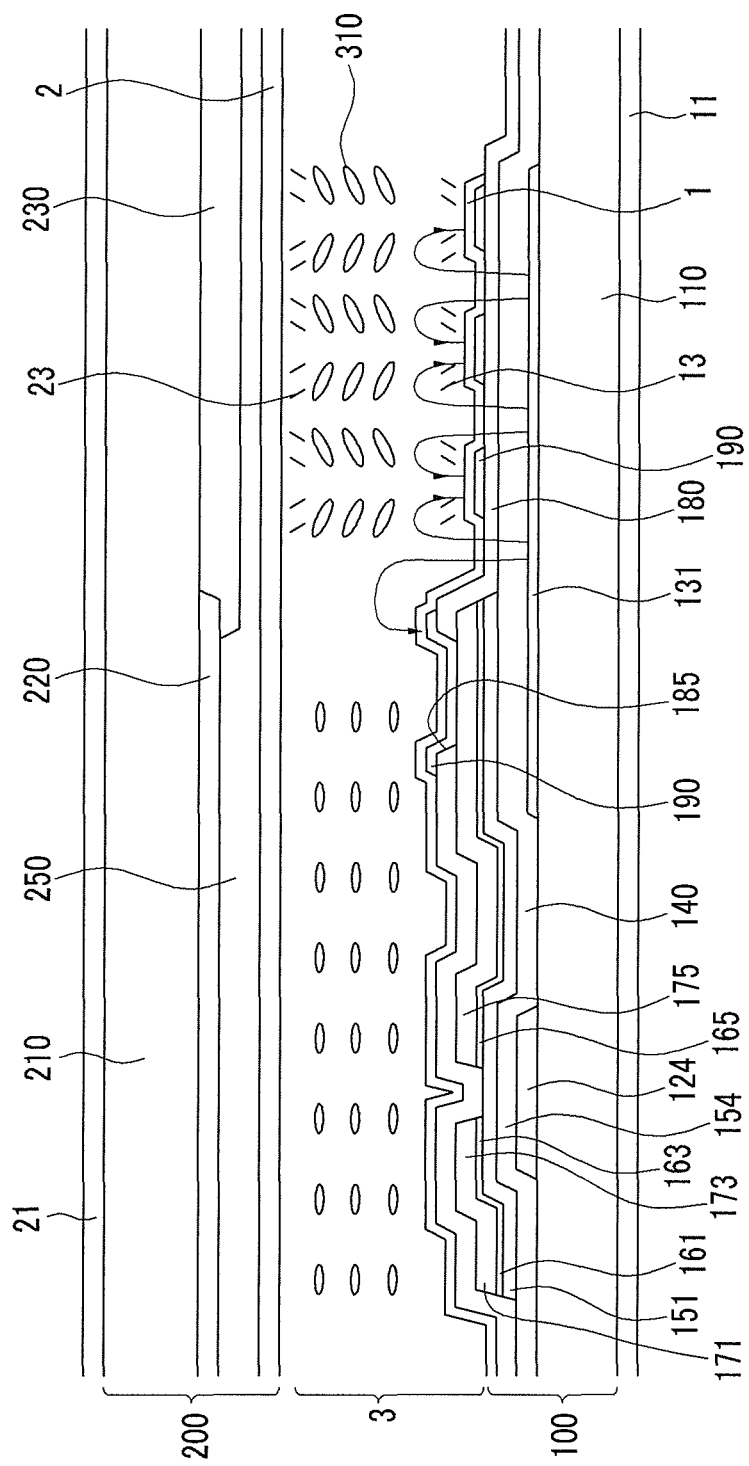
FIG. 10 is a cross-sectional view taken along the line X-X of FIG. 9.

FIG. 9 is a plan view of a liquid crystal display (LCD) according to another exemplary embodiment, and FIG. 10 is a cross-sectional view taken along the line X-X of FIG. 9.

The liquid crystal display (LCD) of FIG. 9 and FIG. 10 has a substantially similar structure as that of the liquid crystal display (LCD) of FIG. 1 and FIG. 2, except for the structure of the common electrode. This difference will be described in more detail.

A common electrode 131 is formed on the first substrate 110, and the common electrode 131 has a continuous surface without a disconnection part in the pixel area. The common electrode 131 overlaps a linear pixel electrode 190, and has an opening 132 overlapping the data line 171. The common electrode 131 may be made of the transparent conductive material such as ITO (indium tin oxide) or IZO (indium zinc oxide).

A protective layer 180 is formed on a data line 171 including a plurality of source electrodes 173, and a drain electrode 175, and the protective layer 180 has a contact hole 185 exposing a portion of the drain electrode 175. The linear pixel electrode 190 is connected to a portion of the drain electrode 175 through the contact hole 185.

The linear pixel electrode 190 has a plurality of belt shapes extending in the longitudinal direction. A first alignment layer 1 is formed on the linear pixel electrode 190. The first alignment layer 1 is a liquid crystal horizontal alignment layer such as a polyamic acid, a polyimide, nylon, PVA (polyvinyl alcohol), and PVC (polyvinyl chloride). The first alignment layer 1 is made of a material having a horizontal alignment characteristic such that a director of the liquid crystal 310 is initially aligned horizontally (e.g., parallel) with respect to the substrate surface. The first alignment layer 1 may weakly undergo a rubbing process with a rubbing strength of less than 250 mm such that the liquid crystal 310 near the first alignment layer 1 may have a pre-tilt.

Also, a light blocking member 220 is formed on the second substrate 210, and a color filter 230 is formed in each region defined by the light blocking member 220.

The color filter 230 and the light blocking member 220 may be formed on the thin film transistor substrate 100.

A capping layer 250 is formed on the color filter 230 and the light blocking member 220, in which the capping layer 250 acts as a planarization layer. A second alignment layer 2 is formed on the capping layer 250. The second alignment layer 2 is also a liquid crystal horizontal alignment layer such as a polyamic acid, a polyimide, nylon, PVA (polyvinyl alcohol), and PVC (polyvinyl chloride). The second alignment layer 2 is made of a material having a horizontal alignment characteristic such that a director of the liquid crystal 310 is initially aligned horizontally with respect to the substrate surface. The second alignment layer 2 slightly undergoes the rubbing process with a rubbing strength of less than 250 mm such that the liquid crystal 310 near the second alignment layer 2 may have the pre-tilt.

The liquid crystal layer 3 includes a liquid crystal 310 having an anisotropic positive dielectric constant, and the first alignment polymer 13 positioned near the first alignment layer 1 and the second alignment polymer 23 near the second alignment layer 2 are formed in the liquid crystal layer 3.

The first alignment polymer 13 is formed by photo-polymerizing the photo-polymerizable monomer or oligomer 33 included in the liquid crystal layer 3 to provide the alignment force to the liquid crystal 310, and the second alignment polymer 23 is formed by photo-polymerizing the photo-polymerizable monomer or oligomer 33 included in the liquid crystal layer 3 to provide the alignment force to the liquid crystal 310. The photo-polymerizable monomer or oligomer 33 that is not photo-polymerized may remain in the liquid crystal layer 3.

As described above, the first alignment polymer 13 provides the alignment force to the liquid crystal 310 such that the alignment force of the liquid crystal 310 near the first alignment polymer 13 and having the pre-tilt may be reinforced. Also, the second alignment polymer 23 provides the alignment force to the liquid crystal 310 such that the alignment force of the liquid crystal 310 near the second alignment polymer 23 and having the pre-tilt may be reinforced.

In the IPS type liquid crystal display (LCD) according to the first exemplary embodiment, the electric field formed between the linear common electrode and the linear pixel electrode is decreased away from the linear common electrode and the linear pixel electrode such that the power consumption is increased according to the high threshold voltage, and the linear common electrode and the linear pixel electrode are both formed on one substrate such that the aperture ratio may be decreased. In the FFS (fringe field switching) type liquid crystal display (LCD) according to the second exemplary embodiment, to improve this problem, the common electrode is formed with the continuous surface in the pixel area such that the intensity of the electric field is reinforced, and the common electrode is formed of the transparent conductor such that the aperture ratio is improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

<Description of some of the reference numerals>

| | | | |
|---|---|---|---|
| 1: | first alignment layer | 2: | second alignment layer |
| 3: | liquid crystal layer | 13: | first alignment polymer |
| 23: | second alignment polymer | | |
| 33: | photo-polymerizable monomer or oligomer | | |
| 100: | thin film transistor substrate | 200: | facing substrate |
| 310: | liquid crystal | | |

What is claimed is:

1. A liquid crystal display (LCD) comprising:
a first substrate;
a second substrate facing the first substrate;
a first electrode and a second electrode formed on the first substrate; and
a liquid crystal layer interposed between the first substrate and the second substrate,
wherein a first alignment polymer configured to provide an alignment force to the liquid crystal is at a portion of the liquid crystal layer near the first substrate.

2. The liquid crystal display (LCD) of claim 1, further comprising
a first alignment layer at the first substrate and contacting the liquid crystal layer,
wherein the first alignment polymer is at a portion of the liquid crystal layer near the first alignment layer, and
wherein the first alignment layer is a material configured to horizontally align a liquid crystal of the liquid crystal layer.

3. The liquid crystal display (LCD) of claim 2, wherein the first alignment polymer comprises a polymerized photo-polymerizable monomer or oligomer.

4. The liquid crystal display (LCD) of claim 3, wherein the liquid crystal layer comprises unpolymerized photo-polymerizable monomer or oligomer.

5. The liquid crystal display (LCD) of claim 1, wherein a second alignment polymer is at a portion of the liquid crystal layer near the second substrate, and
the second alignment polymer configured to provide an alignment force to a liquid crystal of the liquid crystal layer.

6. The liquid crystal display (LCD) of claim 5, further comprising
a second alignment layer at the second substrate and contacting the liquid crystal layer,
wherein the second alignment polymer is at a portion of the liquid crystal layer near the second alignment layer, and
the second alignment layer is a material configured to horizontally align the liquid crystal of the liquid crystal layer.

7. The liquid crystal display (LCD) of claim 6, wherein the second alignment polymer comprises a polymerized photo-polymerizable monomer or oligomer.

8. The liquid crystal display (LCD) of claim 7, wherein the liquid crystal layer comprises unpolymerized photo-polymerizable monomer or oligomer.

9. The liquid crystal display (LCD) of claim 1, wherein the first electrode comprises a linear pixel electrode of a plurality of linear pixel electrodes, the second electrode comprises a linear common electrode of a plurality of linear common electrodes, and the linear pixel electrodes and the linear common electrodes are alternately arranged on the first substrate.

10. The liquid crystal display (LCD) of claim 1, wherein the first electrode comprises a linear pixel electrode, and the second electrode comprises a common electrode having a continuous surface in a pixel area.

11. A method for manufacturing a liquid crystal display (LCD), the method comprising:
    forming a first electrode and a second electrode on a first substrate;
    forming a second substrate;
    injecting a liquid crystal and a photo-polymerizable monomer or oligomer between the first substrate and the second substrate; and
    irradiating light to form an alignment polymer by polymerizing the photo-polymerizable monomer or oligomer.

12. The method of claim 11, wherein the photo-polymerizable monomer or oligomer is polymerized under an electric field or a magnetic field.

13. The method of claim 11, wherein the photo-polymerizable monomer or oligomer is polymerized under a temperature in the range from −20° C. to 30° C.

14. The method of claim 11, further comprising:
    forming a second alignment layer on the second substrate; and
    rubbing the second alignment layer with a rubbing strength of less than 250 mm.

15. The method of claim 14, further comprising forming a first alignment layer on the first substrate.

16. The method of claim 15, further comprising rubbing the first alignment layer with a rubbing strength of less than 250 mm.

17. The method of claim 16, wherein the alignment polymer comprises a first alignment polymer formed near the first alignment layer and a second alignment polymer formed near the second alignment layer.

18. The method of claim 11, wherein the first electrode comprises a linear pixel electrode of a plurality of linear pixel electrodes, the second electrode comprises a linear common electrode of a plurality of linear common electrodes, and the linear pixel electrodes and the linear common electrodes are alternately arranged on the first substrate.

19. The method of claim 11, wherein the first electrode comprises a linear pixel electrode, and the second electrode comprises a common electrode having a continuous surface in a pixel area.

* * * * *